US012439372B2

(12) United States Patent
Agarwal et al.

(10) Patent No.: US 12,439,372 B2
(45) Date of Patent: Oct. 7, 2025

(54) NETWORK ASSISTED POSITIONING WITHOUT SERVICE REQUEST PROCEDURE

(71) Applicant: QUALCOMM Incorporated, San Diego, CA (US)

(72) Inventors: Ravi Agarwal, San Diego, CA (US); Gavin Bernard Horn, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 17 days.

(21) Appl. No.: 17/076,920

(22) Filed: Oct. 22, 2020

(65) Prior Publication Data
US 2021/0185637 A1     Jun. 17, 2021

Related U.S. Application Data

(60) Provisional application No. 62/948,356, filed on Dec. 16, 2019.

(51) Int. Cl.
*H04W 74/0833* (2024.01)
*H04L 5/00* (2006.01)
(Continued)

(52) U.S. Cl.
CPC ......... *H04W 68/005* (2013.01); *H04L 5/0055* (2013.01); *H04W 8/08* (2013.01); *H04W 16/28* (2013.01); *H04W 48/16* (2013.01); *H04W 56/0045* (2013.01); *H04W 64/00* (2013.01); *H04W 72/23* (2023.01); *H04W 74/0833* (2013.01); *H04W 76/11* (2018.02); *H04W 80/02* (2013.01)

(58) Field of Classification Search
CPC ... H04W 48/16; H04W 64/00; H04W 68/005; H04W 72/04; H04W 72/14; H04W 74/006; H04W 74/0833; H04W 76/11
USPC .................................. 370/329, 331; 455/515
See application file for complete search history.

(56) References Cited

U.S. PATENT DOCUMENTS

| 10,051,601 B2 | 8/2018 | Ang et al. |
| 2020/0037367 A1* | 1/2020 | Kim .................... H04W 74/006 |

(Continued)

FOREIGN PATENT DOCUMENTS

| CN | 107005966 A | 8/2017 |
| CN | 110447296 A | 11/2019 |

(Continued)

OTHER PUBLICATIONS

Machine translation of WO 2020020029 (Year: 2020).*
(Continued)

*Primary Examiner* — Harun Chowdhury
(74) *Attorney, Agent, or Firm* — SUNSTEIN LLP

(57) ABSTRACT

Techniques for determining the location of user equipment (UE) are provided. An example of a method for providing positioning information to a network server includes receiving a paging message requesting positioning information for a user equipment (UE) from the network server, transmitting an over-the-air paging message for the UE, receiving a response message from the UE, determining the positioning information based at least in part on the response message, and providing the positioning information to the network server.

16 Claims, 13 Drawing Sheets

(51) Int. Cl.
| | |
|---|---|
| *H04W 8/08* | (2009.01) |
| *H04W 16/28* | (2009.01) |
| *H04W 48/16* | (2009.01) |
| *H04W 56/00* | (2009.01) |
| *H04W 64/00* | (2009.01) |
| *H04W 68/00* | (2009.01) |
| *H04W 72/23* | (2023.01) |
| *H04W 76/11* | (2018.01) |
| *H04W 80/02* | (2009.01) |

(56) References Cited

U.S. PATENT DOCUMENTS

| | | |
|---|---|---|
| 2020/0229130 A1 | 7/2020 | Keating et al. |
| 2021/0259013 A1* | 8/2021 | Wong .............. H04W 74/0833 |
| 2022/0015152 A1* | 1/2022 | Chen .................. H04W 72/04 |

FOREIGN PATENT DOCUMENTS

| | | | |
|---|---|---|---|
| EP | 3358894 A1 | 8/2018 | |
| WO | WO-2006000094 A1 | 1/2006 | |
| WO | 2016148816 | 9/2016 | |
| WO | WO-2018034602 A1 | 2/2018 | |
| WO | WO-2020020029 A1 * | 1/2020 | ........ H04W 74/0833 |

OTHER PUBLICATIONS

Taiwan Search Report—TW109137665—TIPO—Mar. 9, 2024.
3GPP TS 38.331: "3rd Generation Partnership Project, Technical Specification Group Radio Access Network, NR, Radio Resource Control (RRC) Protocol Specification (Release 15)", 3GPP TS 38.331, V15.7.0, Sep. 27, 2019, XP051799980, pp. 1-526.
"3rd Generation Partnership Project, Technical Specification Group Radio Access Network, NR, Radio Resource Control (RRC) Protocol Specification (Release 15)", 3GPP Draft, 38331-F70, 3rd Generation Partnership Project (3GPP), Mobile Competence Centre, 650, Route Des Lucioles, F-06921 Sophia-Antipolis Cedex, France, Sep. 27, 2019 (Sep. 27, 2019), XP051799980, 526 Pages, Retrieved from the Internet: URL: https://ftp.3gpp.org/3guInternal/3GPP_ultimate_versions_to_be_transposed/sentToDpc/38331-f70.zip. [retrieved on Sep. 27, 2019] paragraph [5.3.2]—paragraph [5.3.3] paragraph [5.3.7.8] paragraph [5.3.13] paragraph [5.3.15].
International Search Report and Written Opinion—PCT/US2020/057565—ISA/EPO—Jan. 22, 2021.
Mitsubishi Electric: "Views on Physical-Layer Procedures for NR Positioning", 3GPP Draft, 3GPP TSG RAN WG1 Meeting #97, R1-1907188, Procedure A, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728631, 3 Pages, Retrieved from the Internet: URL: http://www.3gpp.org/ftp/Meetings%5F3GPP%5FSYNC/RAN1/Docs/R1%2D1907188%2Ezip. [retrieved on May 13, 2019] the whole document.
Nokia et al., "Views on Physical Layer Procedures for NR Positioning", 3GPP Draft, 3GPP TSG RAN WG1 #96bis, R1-1905264, PHY Procedures, 3rd Generation Partnership Project (3GPP), Mobile Competence Centre, 650, Route Des Lucioles, F-06921 Sophia-Antipolis Cedex, France, vol. RAN WG1, No. Xian, China, Apr. 8, 2019-Apr. 12, 2019, Apr. 2, 2019 (Apr. 2, 2019), XP051707401, 6 Pages, Retrieved from the Internet: URL: http://www.3gpp.org/ftp/tsg%5Fran/WG1%5FRL1/TSGR1%5F96b/Docs/R1%2D1905264%2Ezip. [retrieved on Apr. 2, 2019] the whole document.

* cited by examiner

NETWORK ASSISTED POSITIONING WITHOUT SERVICE REQUEST PROCEDURE

CROSS-REFERENCE TO RELATED APPLICATION

This application claims the benefit of U.S. Provisional Application No. 62/948,356, filed Dec. 16, 2019, entitled "Network Assisted Positioning Without Service Request Procedure," the entire contents of which is hereby incorporated herein by references for all purposes.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), and a fifth-generation (5G) service (e.g., 5G New Radio (5G NR)). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

It is often desirable to know the location of a user equipment (UE), e.g., a cellular phone, with the terms "location" and "position" being synonymous and used interchangeably herein. A location services (LCS) client may desire to know the location of the UE and may communicate with a location center in order to request the location of the UE. The location center and the UE may exchange messages, as appropriate, to obtain a location estimate for the UE. The location center may return the location estimate to the LCS client, e.g., for use in one or more applications. The over-the-air (OTA) messages required to obtain the positioning information require additional radio bandwidth and may cause the UE to utilize power to send and receive the messages.

Obtaining the location of a mobile device that is accessing a wireless network may be useful for many applications including, for example, emergency calls, personal navigation, asset tracking, locating a friend or family member, etc. Existing positioning methods include methods based on measuring radio signals transmitted from a variety of devices including satellite vehicles and terrestrial radio sources in a wireless network such as base stations and access points.

SUMMARY

An example of a method for responding to an over-the-air paging message with a user equipment (UE) according to the disclosure includes receiving the over-the-air paging message indicating a dedicated resource to perform access, performing access using the dedicated resource, and receiving an acknowledgement message in response to performing access.

Implementations of such a method may include one or more of the following features. The dedicated resource may include a preamble for transmission on a random access channel. The dedicated resource may include a preamble for transmission on a random access channel and a uplink grant for transmission on a physical uplink shared channel.

An example of a method for transmitting an over-the-air paging message with a base station according to the disclosure includes transmitting the over-the-air paging message indicating a dedicated resource to perform access, and receiving a response via the dedicated resource.

Implementations of such a method may include one or more of the following features. The dedicated resource may include a preamble for transmission on a random access channel. The dedicated resource may include a preamble for transmission on a random access channel and a uplink grant for transmission on a physical uplink shared channel.

An example of a method for responding to an over-the-air paging message with a user equipment (UE) according to the disclosure includes receiving the over-the-air paging message, performing access using a common resource, and receiving an acknowledgement message including an indication to remain in an idle state in response to performing access.

Implementations of such a method may include one or more of the following features. The acknowledgement message may include a random access response medium access control layer protocol data unit. The acknowledgement message may include a medium access control sub-header in a random access response medium access control layer protocol data unit. The indication to remain in the idle state may be included in a medium access control payload in a random access response medium access control layer protocol data unit.

An example of a method for transmitting an over-the-air paging message with a base station according to the disclosure includes transmitting the over-the-air paging message for a user equipment (UE), receiving a response via a common resource, and transmitting an acknowledgement message including an indication for the UE to remain in an idle state.

Implementations of such a method may include one or more of the following features. The acknowledgement message may include a random access response medium access control layer protocol data unit. The acknowledgement message may include a medium access control sub-header in a random access response medium access control layer protocol data unit. The indication for the UE to remain in the idle state may be included in a medium access control payload in a random access response medium access control layer protocol data unit.

An example of a method for providing positioning information to a network server according to the disclosure includes receiving a paging message requesting positioning information for a user equipment (UE) from the network server, transmitting an over-the-air paging message for the UE, receiving a response message from the UE, determining the positioning information based at least in part on the response message, and providing the positioning information to the network server.

Implementations of such a method may include one or more of the following features. The paging message requesting positioning information may include requesting a Cell ID, Timing Advance, and an Angle of Arrival. The over-the-air paging message for the UE may include an indication of a dedicated resource for the UE to use to provide the response message. The dedicated resource may include a preamble for transmission on a random access channel. The dedicated resource may include a preamble for transmission on a random access channel and a uplink grant for transmission on a physical uplink shared channel. The response message received from the UE may be a secure message. The positioning information to the network server may include providing the secure response message received from the UE to the network server. The network server may be an Access and Mobility Management Function (AMF) server configured to verify the secure message prior to sending the positioning information to a Location Management Function (LMF) server. Determining the positioning information may include determining a Cell ID, Timing Advance and an Angle of Arrival based on the response message. Providing the positioning information to the network server may include providing a Cell ID, a Timing Advance, and an Angle of Arrival in an Initial UE message. An access complete message may be transmitted to the UE. The access complete message may include a random access response medium access control layer protocol data unit. The access complete message may include an acknowledgment in a medium access control sub-header in the random access response medium access control layer protocol data unit. The access complete message may include an indication for the UE to remain in an idle state. The indication for the UE to remain in the idle state may be included in a medium access control payload in a random access response medium access control layer protocol data unit.

An apparatus according to the disclosure includes a memory, at least one transceiver, at least one processor communicatively coupled to the memory and the at least one transceiver and configured to receive, with the at least one transceiver, an over-the-air paging message indicating a dedicated resource to perform access, perform access using the dedicated resource, and receive, with the at least one transceiver, an acknowledgement message in response to performing access.

Implementations of such an apparatus may include one or more of the following features. The dedicated resource may include a preamble for transmission on a random access channel. The dedicated resource may include a preamble for transmission on a random access channel and a uplink grant for transmission on a physical uplink shared channel.

An example apparatus according to the disclosure includes a memory, at least one transceiver, at least one processor operably coupled to the memory and the at least one transceiver and configured to transmit, with the at least one transceiver, an over-the-air paging message indicating a dedicated resource to perform access, and receive, with the at least one transceiver, a response via the dedicated resource.

Implementations of such an apparatus may include one or more of the following features. The dedicated resource may include a preamble for transmission on a random access channel. The dedicated resource may include a preamble for transmission on a random access channel and a uplink grant for transmission on a physical uplink shared channel.

An example apparatus according to the disclosure includes a memory, at least one transceiver, at least one processor communicatively coupled to the memory and the at least one transceiver and configured to receive, with the at least one transceiver, an over-the-air paging message, perform access using a common resource, and receive, with the at least one transceiver, an acknowledgement message including an indication to remain in an idle state in response to performing access.

Implementations of such an apparatus may include one or more of the following features. The acknowledgement message may include a random access response medium access control layer protocol data unit. The acknowledgement message may include a medium access control sub-header in a random access response medium access control layer protocol data unit. The indication to remain in the idle state may be included in a medium access control payload in a random access response medium access control layer protocol data unit.

An example apparatus according to the disclosure includes a memory, at least one transceiver, at least one processor communicatively coupled to the memory and the at least one transceiver and configured to transmit, with the at least one transceiver, an over-the-air paging message for a user equipment (UE), receive, with the at least one transceiver, a response via a common resource, and transmit, with the at least one transceiver, an acknowledgement message including an indication for the UE to remain in an idle state.

Implementations of such an apparatus may include one or more of the following features. The acknowledgement message may include a random access response medium access control layer protocol data unit. The acknowledgement message may include a medium access control sub-header in a random access response medium access control layer protocol data unit. The indication for the UE to remain in the idle state may be included in a medium access control payload in a random access response medium access control layer protocol data unit.

An example apparatus according to the disclosure includes a memory, at least one transceiver, at least one processor communicatively coupled to the memory and the at least one transceiver and configured to receive, with the at least one transceiver, a paging message requesting positioning information for a user equipment (UE) from a network server, transmit, with the at least one transceiver, an over-the-air paging message for the UE, receive, with the at least one transceiver, a response message from the UE, determine positioning information based at least in part on the response message, and provide the positioning information to the network server.

Implementations of such an apparatus may include one or more of the following features. The paging message requesting positioning information may include requesting a Cell ID, Timing Advance, and an Angle of Arrival. The over-the-air paging message for the UE may include an indication of a dedicated resource for the UE to use to provide the response message. The dedicated resource may include a preamble for transmission on a random access channel. The dedicated resource may include a preamble for transmission on a random access channel and a uplink grant for transmission on a physical uplink shared channel. The response message received from the UE may be a secure message. The at least one processor may be further configured to provide the secure response message received from the UE to the network server. The network server may be an Access and Mobility Management Function (AMF) server configured to verify the secure message prior to sending the positioning information to a Location Management Function (LMF) server. The at least one processor may be further configured to determine a Cell ID, Timing Advance and an Angle of Arrival based on the response message. The at least one processor may be further configured to provide a Cell ID, a Timing Advance, and an Angle of Arrival in an Initial UE message. The at least one processor may be further configured to transmit, with the at least one transceiver, an access complete message to the UE. The access complete message may include a random access response medium access control layer protocol data unit. The access complete message may include an acknowledgment in a medium access control sub-header in the random access response medium access control layer protocol data unit. The access complete message may include an indication for the UE to remain in an idle state. The indication for the UE to remain in the idle state may be included in a medium access control payload in a random access response medium access control layer protocol data unit.

An example apparatus for responding to an over-the-air paging message with a user equipment (UE) according to the disclosure includes means for receiving the over-the-air paging message indicating a dedicated resource to perform access, means for performing access using the dedicated resource, and means for receiving an acknowledgement message in response to performing access.

An example apparatus for transmitting an over-the-air paging message with a base station according to the disclosure includes means for transmitting the over-the-air paging message indicating a dedicated resource to perform access, and means for receiving a response via the dedicated resource.

An example apparatus for responding to an over-the-air paging message with a user equipment (UE) according to the disclosure includes means for receiving the over-the-air paging message, means for performing access using a common resource, and means for receiving an acknowledgement message including an indication to remain in an idle state in response to performing access.

An example apparatus for transmitting an over-the-air paging message with a base station according to the disclosure includes means for transmitting the over-the-air paging message for a user equipment (UE), means for receiving a response via a common resource, and means for transmitting an acknowledgement message including an indication for the UE to remain in an idle state.

An example apparatus for providing positioning information to a network server according to the disclosure includes means for receiving a paging message requesting positioning information for a user equipment (UE) from the network server, means for transmitting an over-the-air paging message for the UE, means for receiving a response message from the UE, means for determining the positioning information based at least in part on the response message, and means for providing the positioning information to the network server.

An example non-transitory processor-readable storage medium comprising processor-readable instructions configured to cause one or more processors to respond to an over-the-air paging message with a user equipment (UE) according to the disclosure includes code for receiving the over-the-air paging message indicating a dedicated resource to perform access, code for performing access using the dedicated resource, and code for receiving an acknowledgement message in response to performing access.

An example non-transitory processor-readable storage medium comprising processor-readable instructions configured to cause one or more processors to transmit an over-the-air paging message with a base station according to the disclosure includes code for transmitting the over-the-air paging message indicating a dedicated resource to perform access, and code for receiving a response via the dedicated resource.

An example non-transitory processor-readable storage medium comprising processor-readable instructions configured to cause one or more processors to respond to an over-the-air paging message with a user equipment (UE) according to the disclosure includes code for receiving the over-the-air paging message, code for performing access using a common resource, and code for receiving an acknowledgement message including an indication to remain in an idle state in response to performing access.

An example non-transitory processor-readable storage medium comprising processor-readable instructions configured to cause one or more processors to transmit an over-the-air paging message with a base station according to the disclosure includes code for transmitting the over-the-air paging message for a user equipment (UE), code for receiving a response via a common resource, and code for transmitting an acknowledgement message including an indication for the UE to remain in an idle state.

An example non-transitory processor-readable storage medium comprising processor-readable instructions configured to cause one or more processors to provide positioning information to a network server according to the disclosure includes code for receiving a paging message requesting positioning information for a user equipment (UE) from the network server, code for transmitting an over-the-air paging message for the UE, code for receiving a response message from the UE, code for determining the positioning information based at least in part on the response message, and code for providing the positioning information to the network server.

Items and/or techniques described herein may provide one or more of the following capabilities, as well as other capabilities not mentioned. A server on a communication network may request positioning information for a UE from one or more base stations. The requested positioning information may include a cell identification (Cell ID) for the base station serving the UE, a Timing Advance (TA) associated with the UE, and an Angle of Arrival (AoA) associated with the UE. The one or more base stations may transmit over-the-air (OTA) paging messages. The OTA messages may include an indication of a dedicated resource on which the UE may respond. The UE may respond to the paging message on a common resource or a dedicated resource (if provided in the paging message). The response from the UE may be sent as a secure message. The base station may determine the TA and AoA based on the UE's response message. The base station may provide an access complete message to the UE indicating that the UE should remain in an idle mode. The base station may also provide the Cell ID, TA, and AoA to the server. Other capabilities may be provided and not every implementation according to the disclosure must provide any, let alone all, of the capabilities discussed.

DETAILED DESCRIPTION

Techniques are discussed herein for determining the location of user equipment (UE). In general, a network assisted positioning procedure includes obtaining measurements associated with a UE location from a base station such as a Fifth Generation (5G) Next Generation (NG) RAN node (NG-RAN). A network assisted positioning procedure may include a network triggered service request including an Access and Mobility Management Function (AMF) paging the UE via NG-RAN node(s). The UE may move from an idle state (e.g., CM_IDLE, RRC_IDLE) to a connected state (e.g., RRC_CONNECTED) involving a random access procedure on the serving NG-RAN node. The network may then setup a signaling connection between the UE and the AMF and a data connection between the UE and a User Plane Function (UPF). Placing the UE in a connected state increases the power consumption of the UE and increases the OTA bandwidth required between the UE and the NG-RAN. Further, the required signaling and data connections may increase the processing load on the network and thus increase consumption of network inter-node signaling resources.

As described herein, UE power consumption and OTA bandwidth may be reduced for some positioning techniques. For example, a UE may be configured to perform a random access procedure while in an idle state (i.e., without moving to a connected state). The same positioning technique may be used to eliminate the need to setup signaling and data connections between the UE and the AMF and UPF, respectively. Eliminating the need for placing the UE in a connected state, as describe herein, provides savings in the form of reduced UE power consumption. The corresponding messaging also reduces OTA consumption of resources and then reduces the required network inter-node signaling. These techniques and configurations are examples, and other techniques and configurations may be used.

Figure 1:
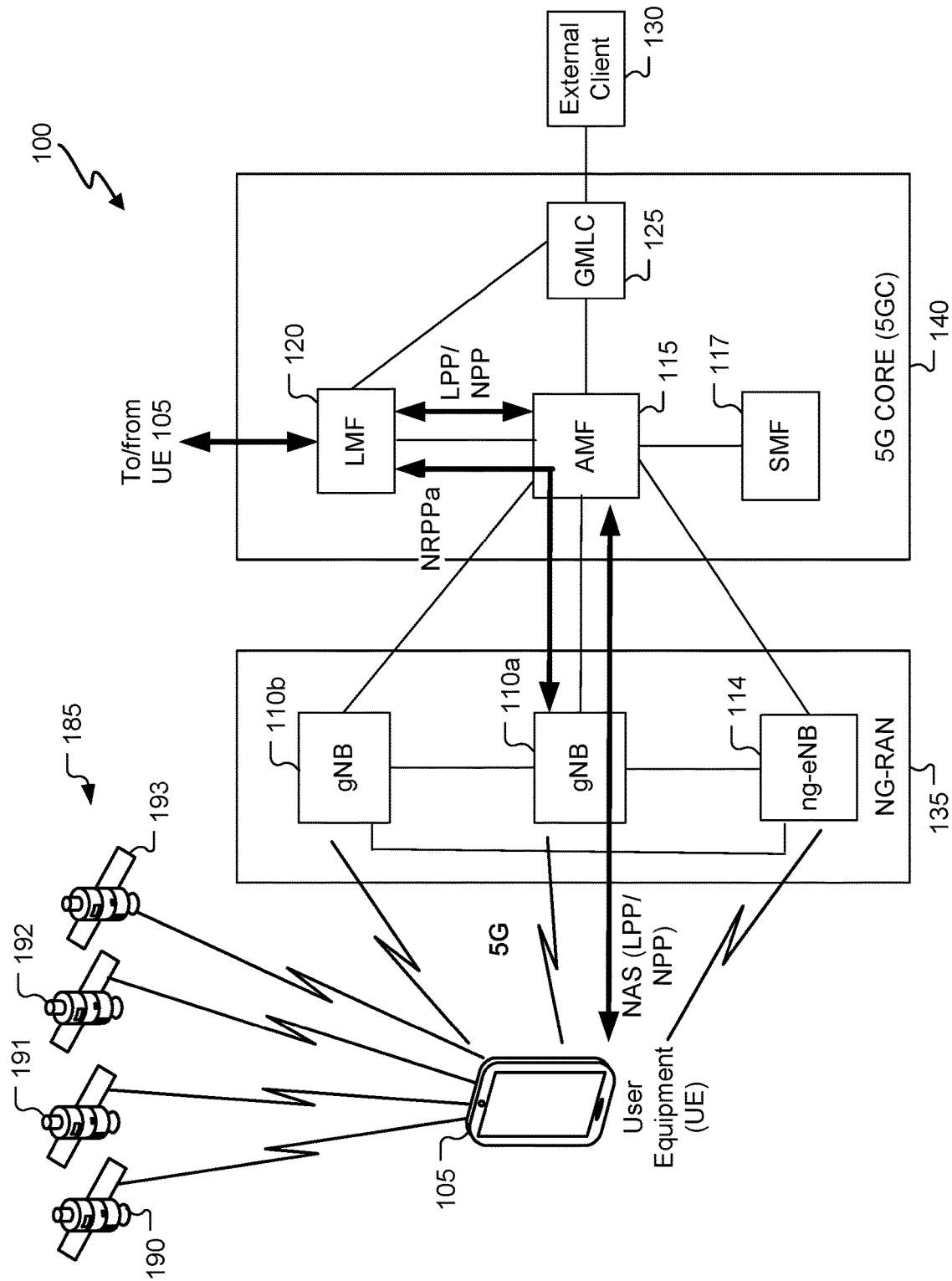
FIG. 1 is a simplified diagram of an example wireless communications system.

Referring to FIG. 1, an example of a communication system 100 includes a UE 105, a Radio Access Network (RAN) 135, here a Fifth Generation (5G) Next Generation (NG) RAN (NG-RAN), and a 5G Core Network (5GC) 140. The UE 105 may be, e.g., an IoT device, a location tracker device, a cellular telephone, or other device. A 5G network may also be referred to as a New Radio (NR) network; NG-RAN 135 may be referred to as a 5G RAN or as an NR-RAN node; and 5GC 140 may be referred to as an NG Core network (NGC). Standardization of an NG-RAN and 5GC is ongoing in the 3$^{rd}$ Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 may be communicatively coupled to each other, are each configured to bi-directionally wirelessly communicate with the UE 105, and are each communicatively coupled to, and configured to bi-directionally communicate with, the AMF 115. The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions.

FIG. 1 provides a generalized illustration of various components, any or all of which may be utilized as appropriate, and each of which may be duplicated or omitted as necessary. Specifically, although only one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 100b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110*a*, 110*b* are examples and may, in various embodiments, be replaced by or include various other location server functionality and/or base station functionality respectively.

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, tracking device, navigation device, Internet of Things (IoT) device, asset tracker, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110*a* and 110*b*. Pairs of the gNBs 110*a*, 110*b* in the NG-RAN 135 may be connected to one another via one or more other gNBs. Access to the 5G network is provided to the UE 105 via wireless communication between the UE 105 and one or more of the gNBs 110*a*, 110*b*, which may provide wireless communications access to the 5GC 140 on behalf of the UE 105 using 5G. In FIG. 1, the serving gNB for the UE 105 is assumed to be the gNB 110*a*, although another gNB (e.g. the gNB 110*b*) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110*a*, 110*b* in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110*a*, 110*b* and/or the ng-eNB 114 may be configured to function as positioning-only beacons which may transmit signals to assist with determining the position of the UE 105 but may not receive signals from the UE 105 or from other UEs.

The BSs 110*a*, 110*b*, 114 may each comprise one or more TRPs. For example, each sector within a cell of a BS may comprise a TRP, although multiple TRPs may share one or more components (e.g., share a processor but have separate antennas). The system 100 may include only macro TRPs or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS)

Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110*a*, 110*b* and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications. The LMF 120 may support positioning of the UE 105 when the UE 105 accesses the NG-RAN 135 and may support position procedures/methods such as Assisted GNSS (A-GNSS), Observed Time Difference of Arrival (OTDOA), Real Time Kinematics (RTK), Precise Point Positioning (PPP), Differential GNSS (DGNSS), Enhanced Cell ID (E-CID), angle of arrival (AOA), angle of departure (AOD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the UE 105's location) may be performed at the UE 105 (e.g., using signal measurements obtained by the UE 105 for signals transmitted by wireless nodes such as the gNBs 110*a*, 110*b* and/or the ng-eNB 114, and/or assistance data provided to the UE 105, e.g. by the LMF 120).

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though only one of these connections may be supported by the 5GC 140 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS transmissions from the gNBs 110*a*, 110*b*, and/or the ng-eNB 114.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time Of Arrival (TOA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS beams from a plurality of base stations (such as the gNBs 110*a*, 110*b*, the ng-eNB 114, etc.) to compute the UE's position.

Figure 2:
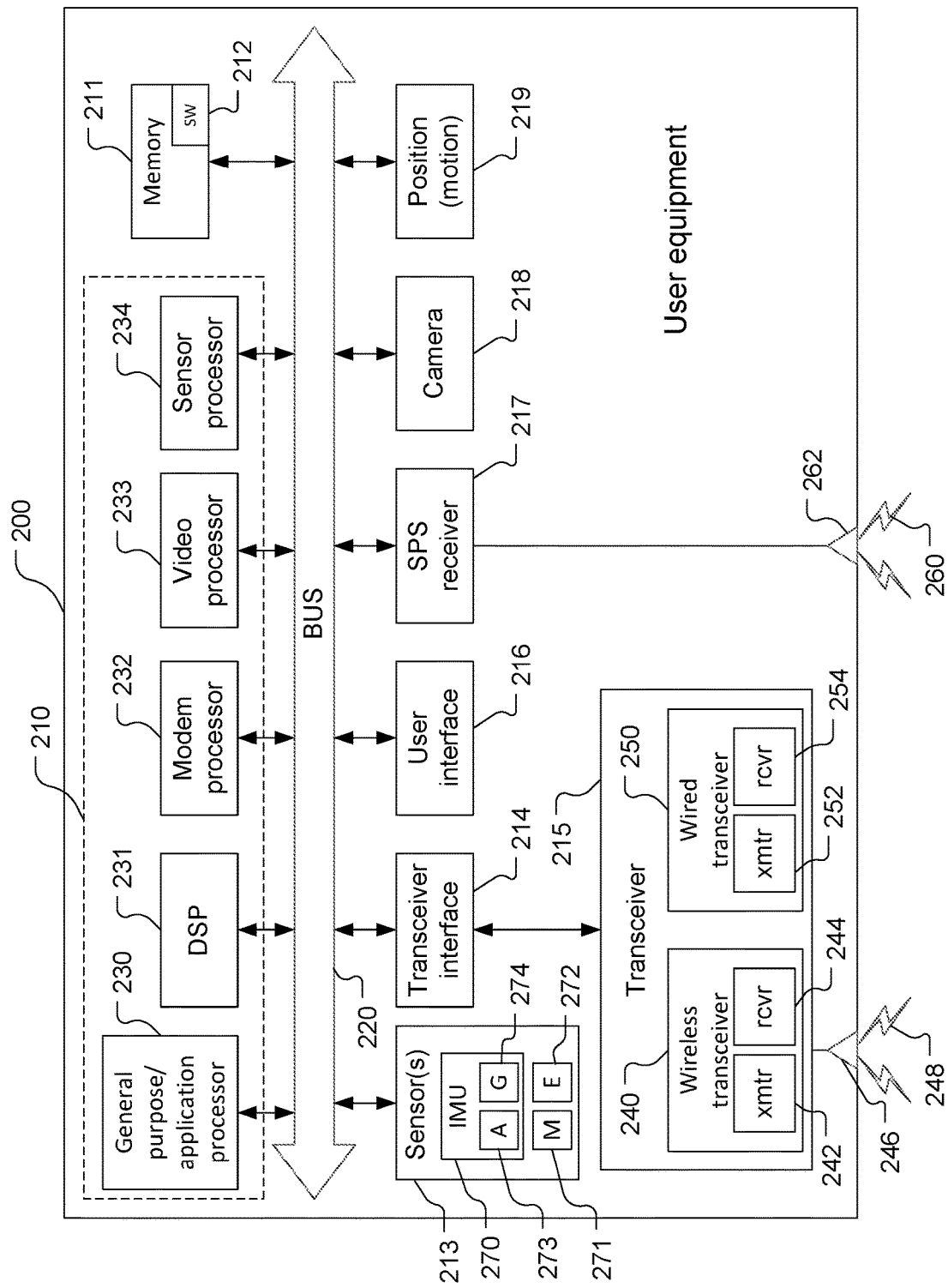
FIG. 2 is a block diagram of components of an example user equipment shown in FIG. 1.

Referring also to FIG. 2, a UE 200 is an example of the UE 105 and comprises a computing platform including a processor 210, memory 211 including software (SW) 212, one or more sensors 213, a transceiver interface 214 for a transceiver 215, a user interface 216, a Satellite Positioning System (SPS) receiver 217, a camera 218, and a position (motion) device 219. The processor 210, the memory 211, the sensor(s) 213, the transceiver interface 214, the user interface 216, the SPS receiver 217, the camera 218, and the position (motion) device 219 may be communicatively coupled to each other by a bus 220 (which may be configured, e.g., for optical and/or electrical communication). One or more of the shown apparatus (e.g., the camera 218, the position (motion) device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for radar, ultrasound, and/or lidar, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer only to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the invention, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, the wireless transceiver 240, and one or more of the sensor(s) 213, the user interface 216, the SPS receiver 217, the camera 218, the PMD 219, and/or the wired transceiver 250.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, an Inertial Measurement Unit (IMU) 270, one or more magnetometers 271, and/or one or more environment sensors 272. The IMU 270 may comprise one or more inertial sensors, for example, one or more accelerometers 273 (e.g., collectively responding to acceleration of the UE 200 in three dimensions) and/or one or more gyroscopes 274. The magnetometer(s) may provide measurements to determine orientation (e.g., relative to magnetic north and/or true north) that may be used for any of a variety of purposes, e.g., to support one or more compass applications. The environment sensor(s) 272 may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU 270 may be configured to provide measurements about a direction of motion and/or a speed of motion of the UE 200, which may be used in relative location determination. For example, the one or more accelerometers 273 and/or the one or more gyroscopes 274 of the IMU 270 may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) 273 and gyroscope(s) 274 taken after this moment in time may be used in dead reckoning to determine present location of the UE 200 based on movement (direction and distance) of the UE 200 relative to the reference location.

The magnetometer(s) 271 may determine magnetic field strengths in different directions which may be used to determine orientation of the UE 200. For example, the orientation may be used to provide a digital compass for the UE 200. The magnetometer(s) 271 may include a two-dimensional magnetometer configured to detect and provide indications of magnetic field strength in two orthogonal dimensions. Also or alternatively, the magnetometer(s) 271 may include a three-dimensional magnetometer configured to detect and provide indications of magnetic field strength in three orthogonal dimensions. The magnetometer(s) 271 may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a transmitter 242 and receiver 244 coupled to one or more antennas 246 for transmitting (e.g., on one or more uplink channels) and/or receiving (e.g., on one or more downlink channels) wireless signals 248 and transducing signals from the wireless signals 248 to wired (e.g., electrical and/or optical) signals and from wired (e.g., electrical and/or optical) signals to the wireless signals 248. Thus, the transmitter 242 may include multiple transmitters that may be discrete components or combined/integrated components, and/or the receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a transmitter 252 and a receiver 254 configured for wired communication, e.g., with the NG-RAN 135 to send communications to, and receive communications from, the gNB 110*a*, for example. The transmitter 252 may include multiple transmitters that may be discrete components or combined/integrated components, and/or the receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position (motion) device (PMD) 219 may be configured to determine a position and possibly motion of the UE 200. For example, the PMD 219 may communicate with, and/or include some or all of, the SPS receiver 217. The PMD 219 may also or alternatively be configured to determine location of the UE 200 using terrestrial-based signals (e.g., at least some of the signals 248) for trilateration, for assistance with obtaining and using the SPS signals 260, or both. The PMD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PMD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PMD 219 may be configured to provide indications of uncertainty and/or error in the determined position and/or motion.

Figure 3:
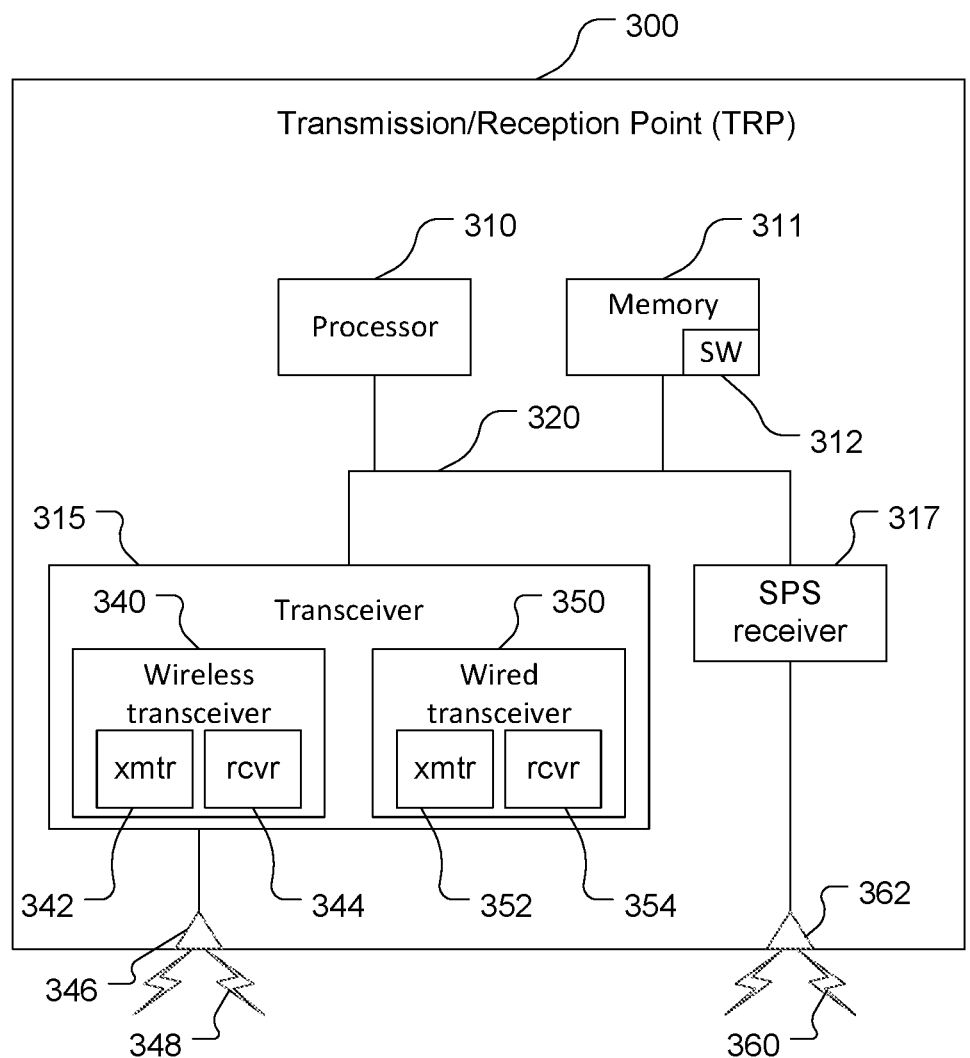
FIG. 3 is a block diagram of components of an example transmission/reception point shown in FIG. 1.
Figure 4:
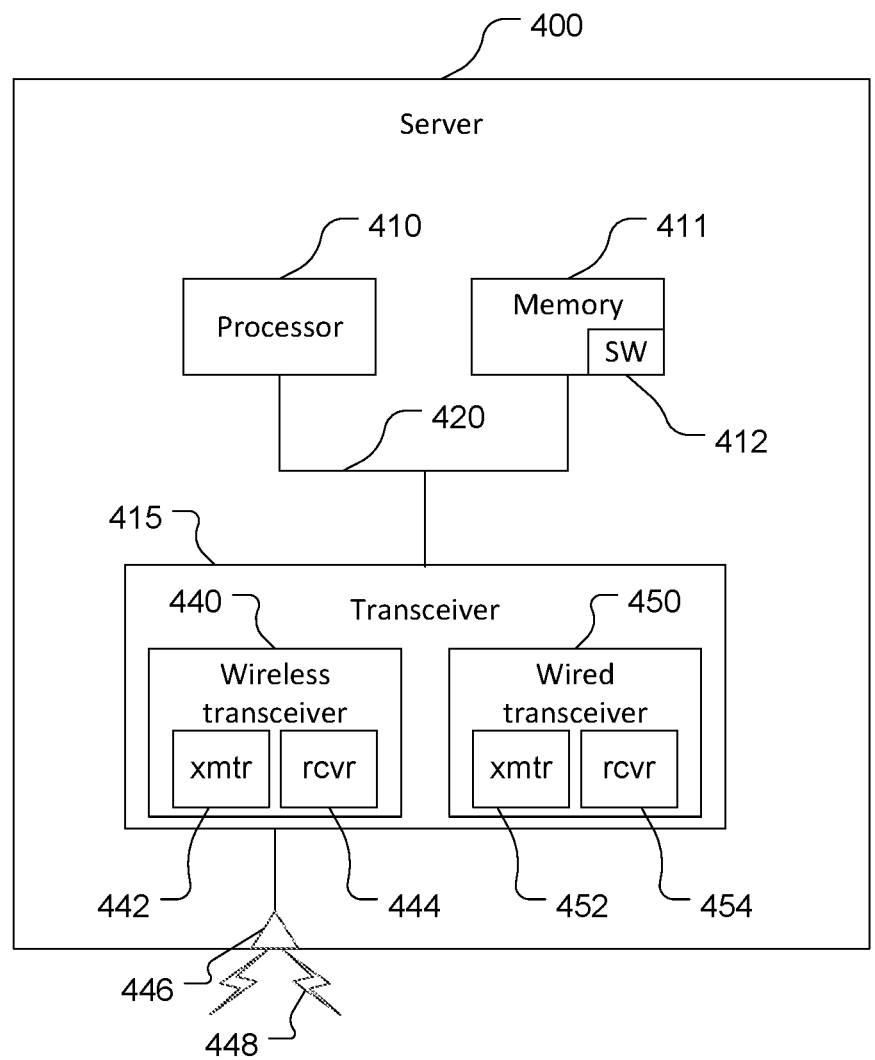
FIG. 4 is a block diagram of components of an example server shown in FIG. 1.

Referring also to FIG. 3, an example of a TRP 300 of the BSs 110a, 110b, 114 comprises a computing platform including a processor 310, memory 311 including software (SW) 312, a transceiver 315, and (optionally) an SPS receiver 317. The processor 310, the memory 311, the transceiver 315, and the SPS receiver 317 may be communicatively coupled to each other by a bus 320 (which may be configured, e.g., for optical and/or electrical communication). One or more of the shown apparatus (e.g., a wireless interface and/or the SPS receiver 317) may be omitted from the TRP 300. The SPS receiver 317 may be configured similarly to the SPS receiver 217 to be capable of receiving and acquiring SPS signals 360 via an SPS antenna 362. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 4). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions. The description may refer only to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels) and/or receiving (e.g., on one or more downlink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a transmitter 352 and a receiver 354 configured for wired communication, e.g., with the network 140 to send communications to, and receive communications from, the LMF 120, for example. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the invention, including the claims, and other configurations may be used. For example, the description herein discusses that the TRP 300 is configured to perform or performs several functions, but one or more of these functions may be performed by a networked server and/or the UE 200 (i.e., the server 400 and/or the UE 200 may be configured to perform one or more of these functions).

Referring also to FIG. 4, an example of a server 400 comprises a computing platform including a processor 410, memory 411 including software (SW) 412, and a transceiver 415. The server 400 may be a network node such as the LMF 120, the AMF 115, the SMF 117, and the GMLC 125. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 4). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting (e.g., on one or more uplink channels) and/or receiving (e.g., on one or more downlink channels) wireless signals 448 and transducing signals from the wireless signals 448 to wired (e.g., electrical and/or optical) signals and from wired (e.g., electrical and/or optical) signals to the wireless signals 448. Thus, the transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., with the NG-RAN 135 to send communications to, and receive communications from, the TRP 300, for example. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the server 400 shown in FIG. 4 is an example and not limiting of the invention, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Figure 5:
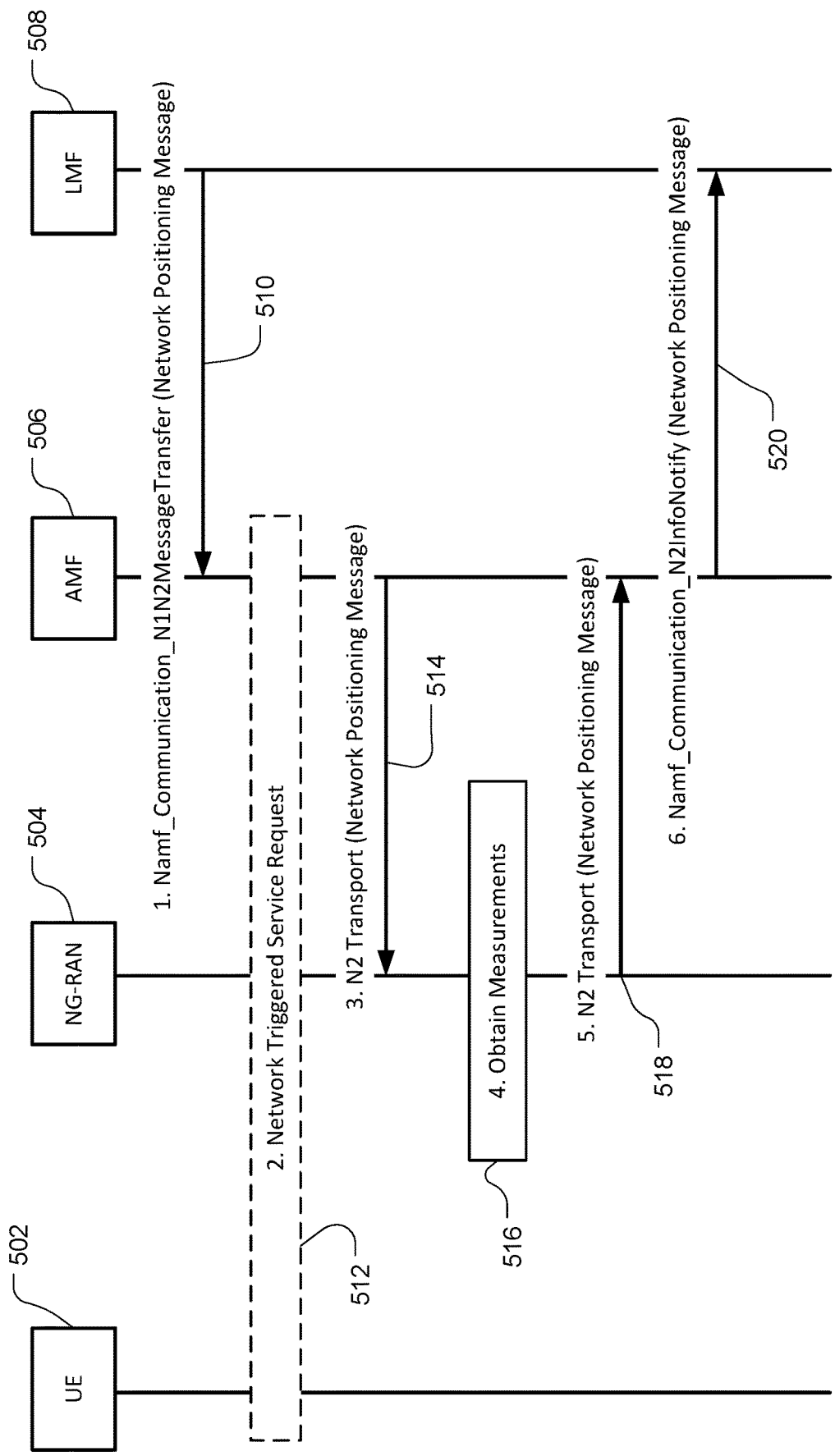
FIG. 5 is a message diagram of an example network assisted positioning procedure.

Referring to FIG. 5, with further reference to FIGS. 1-4, a message diagram of an example network assisted positioning procedure is shown. The network includes one or more UEs 502 and one or more NG-RAN nodes 504. While FIG. 5 depicts only one UE 502 and only one NG-RAN node 504, multiple UEs 502 and NG-RAN nodes 504 may be used in an operational network. The UE 502 is an example of a UE 200 described in FIG. 2. The NG-RAN node 504 is an example of a gNB 110a or ng-eNB 114 described in FIG. 1 and the TRP 300 in FIG. 3. The network also includes an AMF 506 and an LMF 508, also described in FIG. 1 (i.e., the AMF 115 and the LMF 120). FIG. 5 depicts a procedure that may be used by the LMF 508 to support network assisted and network based positioning. The procedure may be based on an NRPPa protocol in 3GPP TS 38.455 between the LMF 508 and the NG-RAN node 504.

In operation, the LMF 508 is configured to invoke a Namf Communication N1N2MessageTransfer service operation 510 towards the AMF 506 to request the transfer of a Network Positioning message to the serving NG-RAN node 504 (e.g., gNB or ng-eNB) for the UE 502. The service operation 510 may include a Network Positioning message and an LCS Correlation identifier. The Network Positioning message may request location information for the UE 502 from the NG-RAN node 504. If the UE 502 is in a RCC_IDLE state, the AMF 506 may initiate a Network Triggered Service Request procedure 512, such as defined in 3GPP TS 38.455, to establish a signaling connection with the UE 502. In general, the term CM_IDLE defines a state when the UE 502 does not have signaling with the AMF 506, and RRC_IDLE is when the UE 502 is in CM_IDLE and moving across different cells controlled by mobility based on cell reselection. CM_IDLE and RCC_IDLE are used interchangeably herein to illustrate lower power consumption as compared to when the UE 502 is in a connected state. The AMF 506 is configured to forward a network positioning message to the serving NG-RAN node 504 in an N2 Transport request message 514. The AMF 506 may include a routing identifier in the N2 Transport request message 514 to identify the LMF 508 (e.g. a global address of the LMF 508). The serving NG-RAN node 504 is configured to obtain location information for the UE 502 based on the content of the N2 Transport message 514. The serving NG-RAN node 504 is configured to return location information obtained at stage 516 to the AMF 506 in a Network Positioning message included in an N2 Transport response message 518. The serving NG-RAN node 504 is configured to also include the routing identifier provided in the N2 Transport request message 514. The AMF 506 may be configured to invoke the Namf Communication N2InfoNotify service 520 towards the LMF 508 indicated by the routing identifier provided in the N2 Transport response message 518. The service 520 includes the network positioning message received in the N2 Transport response message 518 and the LCS Correlation identifier. The process include steps 1 to 6 may be repeated to request further location information and further NG-RAN capabilities.

In general, in current LTE and 5G processes, when the AMF 506 receives the network positioning message 510 from the LMF 508 (which includes the UE ID per 3GPP TS 38.455), the AMF 506 reaches out to all the NG-RAN nodes 504 which may be in communication with the UE 502. For example, the AMF 506 may utilize the network triggered service request procedure 512 as defined in 3GPP TS 23.502 sec. 4.2.3.3. This procedure includes the AMF 506 sending a paging message to all the NG-RAN nodes 504, and then the NG-RAN nodes 504 are configured to send over-the-air (OTA) paging messages to the UEs in their respective coverage areas. The UE 502 responds and the corresponding NG-RAN node 504 provides the response to the AMF 506 within the procedure 512. The AMF 506 is configured to subsequently establish a dedicated connection between the NG-RAN node 504 and the AMF 506, which will be used for further signaling messages to the UE 502. A User Plane Function (UPF) (not shown in FIG. 5) may also have a connection with the NG-RAN node 504 to transfer user data to and from the UE 502. The UE 502 transitions to a connected state (e.g., RRC_CONNECTED), which will use more battery while communicating. The UE 502 may also utilize OTA resources set up by the NG-RAN node 504 while in the connected state. In general, when the network triggered service request procedure 512 is triggered, there will be subsequent data and/or signaling exchanges between the network and the UE 502. Dedicated back haul connections between the AMF 506 and the LMF 508 (and a UPF) are established to facilitate the data and signaling exchanges.

When the network triggered service request 512 is complete, the network positioning message 510 that is waiting at the AMF 506 may be sent to the NG-RAN node 504 over the N2 transport request message 514. The NG-RAN node 504 then determines which measurements are required from the UE 502 and obtains those measurements at stage 516. The NG-RAN node 504 responds with the N2 Transport response message 518 to the AMF 506, and the AMF 506 then transfers the information to the LMF 508 with the network positioning message 520.

Figure 6:
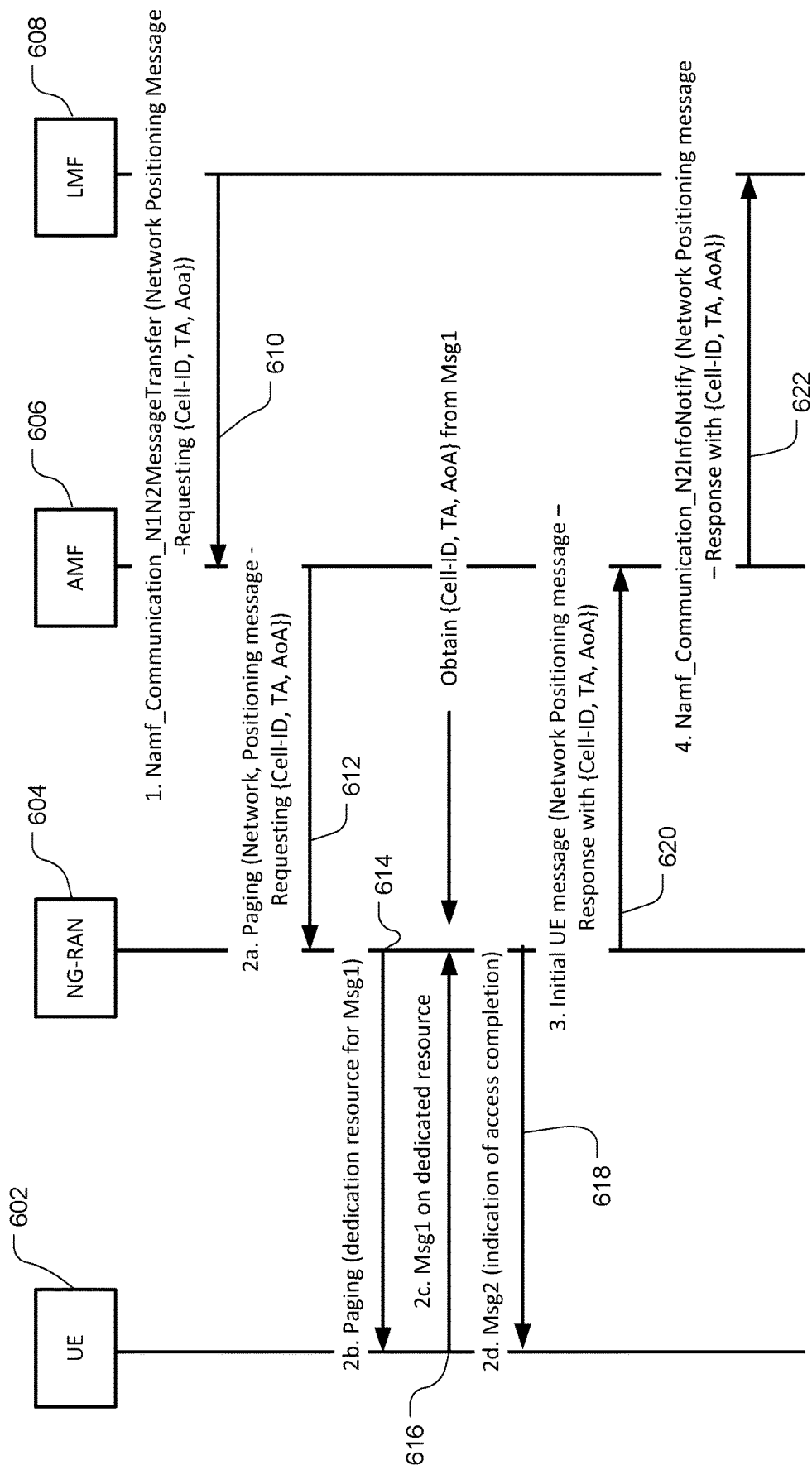
FIG. 6 is an example message diagram of an improved network assisted positioning procedure.

Referring to FIG. 6, with further reference to FIGS. 1-5, an example message diagram of an improved network assisted positioning procedure is shown. Similar to FIG. 5, the network in FIG. 6 includes one or more UEs 602 and one or more NG-RAN nodes 604. Multiple UEs 602 and NG-RAN nodes 604 may be used in an operational network. The UE 602 is an example of a UE 200 described in FIG. 2 and the NG-RAN node 604 is an example of a gNB 110*a* or ng-eNB 114 described in FIG. 1 and the TRP 300 in FIG. 3. The network also includes an AMF 606 and an LMF 608, also described in FIG. 1 (i.e., the AMF 115 and the LMF 120). In an embodiment, the positioning measurements used in the network assisted procedure in FIG. 6 is based on Enhanced Cell ID (ECID). The location of the UE 602 may be determined based on the identity of the serving NG-RAN node 604 (Cell-ID), a distance between the serving NG-RAN node 604 and the UE 602 as measured by a Timing Advance (TA) value, and an Angle of Arrival (AoA) of transmissions from the UE 602 to the NG-RAN node 604. These measurements (i.e., Cell ID, TA, AoA) are sufficient for the LMF 608 to determine the location of the UE 602.

In operation, the LMF 608 is configured to invokes the Namf Communication N1N2MessageTransfer service operation 610 towards the AMF 606 to request the transfer of a network positioning message to the serving NG-RAN node 604 (e.g., gNB 110*a*, 110*b* or ng-eNB 114) for the UE 602. The service operation 610 includes the network positioning message and the LCS Correlation identifier. The network positioning message may request location information for the UE 602 from the NG-RAN node 604. The network positioning message in the service operation 610 requests the Cell-ID, Timing Advance (TA) and Angle of Arrival (AoA) measurements for the UE 602 location determination. In contrast to the message diagram in FIG. 5, if the UE 602 is in a CM IDLE state the AMF 606 does not trigger the network triggered service request 512. Rather, the AMF 606 is configured to execute the procedure provided in FIG. 6 to obtain the requested positioning measurements.

At step 2*a*, the AMF 606 forwards the network positioning message in the service operation 610 (or some aspects thereof) in a paging message 612 to the NG-RAN node 604. At step 2*b*, the NG-RAN node 604 is configured to transmit over-the-air (OTA) paging message 614 for the UE 602. In an example, the NG-RAN node 604 may include an indication of a dedicated resource for the UE 602 to use for transmission of Msg1 616. At step 2*c*, the UE 602 is configured to transmit Msg1 616 on any random access resource, or the dedicated resource if provided. The NG-RAN node 604 is configured to obtain the TA and AoA measurements as well as the Cell ID of the cell the UE 602 performed access on (i.e. the serving NG-RAN node 604) from Msg1 reception. At step 2*d*, the serving NG-RAN node 604 transmits Msg2 618 confirming the reception of Msg1 616. In an example, Msg2 618 may additionally include an indication of access completion to instruct the UE 602 to remain in, or go back to, IDLE mode operation. At step 3, the serving NG-RAN node 604 returns location measurements obtained in step 2*c* to the AMF 606 in a Network Positioning message included in an Initial UE message 620 (or similar message(s)). The serving NG-RAN node 604 is configured to include the routing identifier received in the paging message 612 in the Initial UE message 620. At step 4, the AMF 606 invokes the Namf Communication N2InfoNotify service 622 towards the LMF 608 indicated by the routing identifier included in the Initial UE message 620. The service operation 622 includes the network positioning message received from the Initial UE message 620 and the LCS Correlation identifier. Steps 1 through 4 may be repeated to request further location information and further NG-RAN capabilities.

In an example, the NG-RAN node 604 may utilize the Initial UE message 620 (or similar message) to transfer the positioning measurements to the AMF 606. There is no signaling connection established between NG-RAN node 604 and the AMF 606. Additionally, since there may be no user data, a data connection between NG-RAN 604 node and User Plane Function ((UPF), not shown in FIG. 6) is also not established. This allows for a reduction in signaling overhead between the network nodes.

In an example, the paging message 612 from the AMF 606 to the NG-RAN node 604 may be enhanced to include the network positioning message. Other message formats may be used, but enhancing existing paging procedures and the paging message may reduce implementation impact. In an example, the paging message 614 from the NG-RAN node 604 to the UE 602 may be enhanced to include a dedicated resource for the UE 602 to use for the transmission of Msg1 616. In general, providing a dedicated resource to the UE 602 in the paging message 614 may eliminate contention for the resource to be used for random access. In an example, the dedicated resource may constitute a preamble for transmission on a Random Access Channel (RACH). In an example, the dedicated resource may constitute a preamble for transmission on a Random Access Channel (RACH) and an UL grant for transmission on a Physical Uplink Shared Channel (PUSCH). Including a dedicated resource in paging message 614 is optional. When a dedicated resource is not provided in the paging message 614, the UE 602 may perform a contention based random access procedure.

In an embodiment, Msg2 618 may include an indication for the UE 602 to remain (or go back to) RRC_IDLE mode operation. There may be no need for the UE 602 to transition to RRC_CONNECTED mode since the necessary positioning measurements have already been obtained upon reception of Msg1 616 at the NG-RAN node 604. Enabling the UE 602 to remain in, or go back to, RRC_IDLE provides battery savings at the UE 602 as well as reduces the OTA resource consumption. In an example, Msg2 618 includes a Random Access Response Medium Access Control (MAC) layer protocol data unit (PDU). The Msg2 618 may include an acknowledgment in part of a MAC sub-header in the Random Access Response MAC PDU. In an example, the indication for the UE 602 to remain in RCC_IDLE state is part of a MAC Payload in the Random Access Response MAC PDU.

Figure 7:
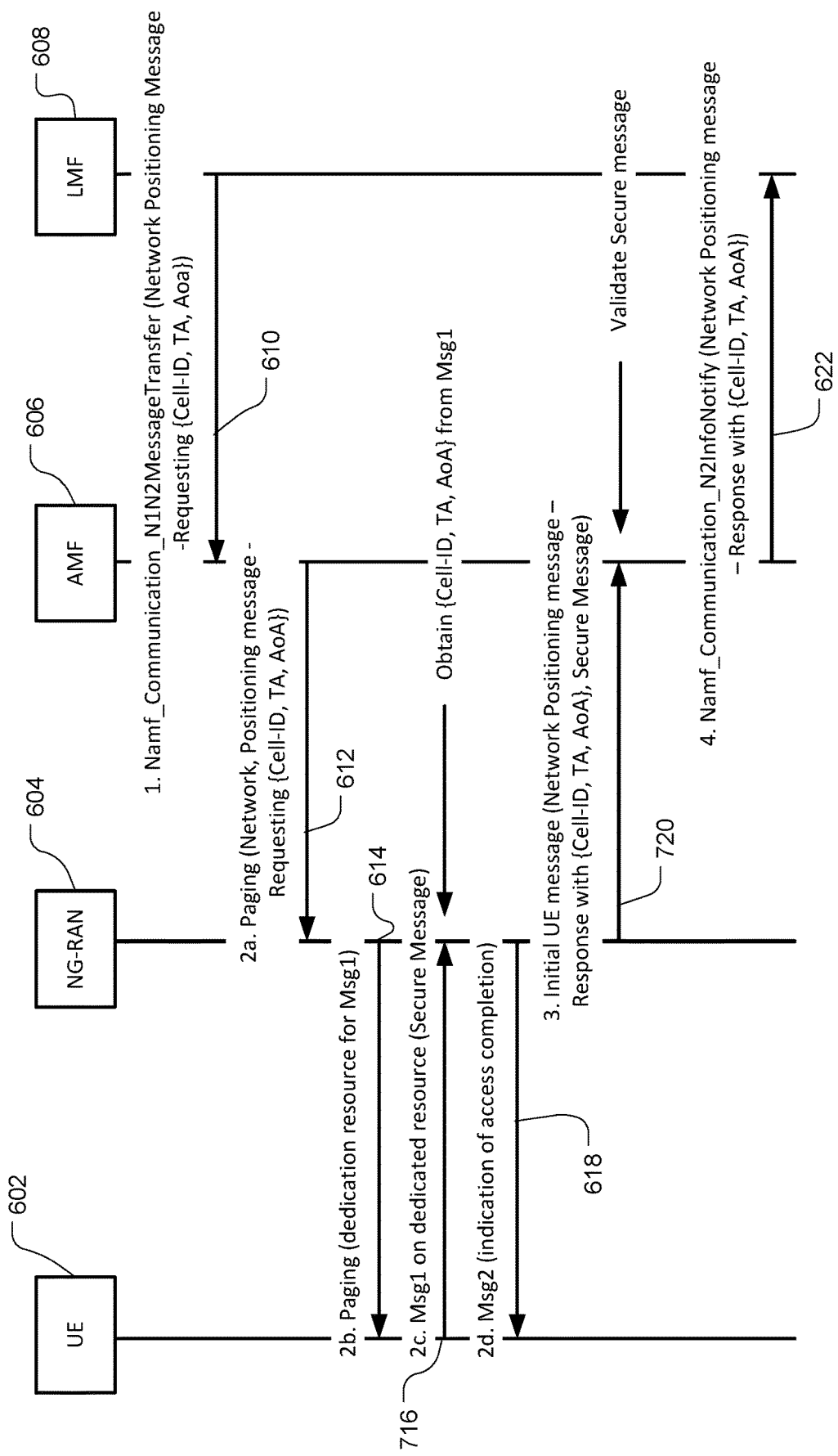
FIG. 7 is a message diagram of the network assisted positioning procedure of FIG. 6 with example security features.

Referring to FIG. 7, a message diagram of the network assisted positioning procedure of FIG. 6 with example security features is shown. The security features provided in FIG. 7 reduce the potential of session hijacking by a malicious UE. For example, in a contention based random access procedure, if Msg1 616 only includes a random access preamble transmission, it may not be possible for the network to identify the UE 602 upon reception of Msg1 616. In such case, the UE 602 may transmit its identity in Msg3 and the network may include the indication for the UE 602 to go back to RRC_IDLE mode operation in Msg4 (Msg3 and Msg4 not shown in FIG. 6). In 5G NR the OTA paging message 614 is not secured (i.e. not ciphered or integrity protected). This means that any UE with a strong enough signal may decode and interpret the paging message 614. The procedure without security shown in FIG. 6 does not require the UE 602 to transmit any secure messages. While this may be desirable from a UE battery savings and OTA resource consumption points of view, it may not be secure since a malicious UE may decode the paging message 614 and transmit Msg1 616. In this example, the network cannot distinguish whether Msg1 616 was transmitted by the intended UE (i.e., UE 602) or a malicious UE (not shown in FIG. 6). In an example, to secure against a malicious UE, the UE 602 may be required to transmit a secure message to validate its identity. The secure message may be transmitted as part of Msg1 716 (contention free or contention based access) or included in Msg3 (contention free or contention based access). The message from UE 602 may be secured using non-access stratum (NAS) security context available at the UE 602. In case the UE 602 transmits Msg3 (not shown in FIG. 7)—either to include its identity and/or to include a secure message—the network may transmit the indication for the UE 602 to go back to RRC_IDLE mode operation in Msg4 (not shown in FIG. 7). In the exemplary procedure with security shown in FIG. 7, a secure message is transmitted as part of Msg1 716 and the indication to go back to RRC_IDLE mode operation is transmitted in Msg2 618.

In an example, the UE 602 may be required to transmit a secure message to validate its identity, the NG-RAN 604 is configured to forward the received secure message in Msg1 716 to the AMF 606 in the Initial UE message 720 for security validation. If validation passes, the AMF 606 may proceed with step 4 shown in exemplary message diagrams in FIGS. 6 and 7. Else, the AMF 606 may start again from step 2. In case of repeated security validation failures, the AMF 606 may notify the LMF 608 of an error in obtaining the requested positioning measurements.

Figure 8:
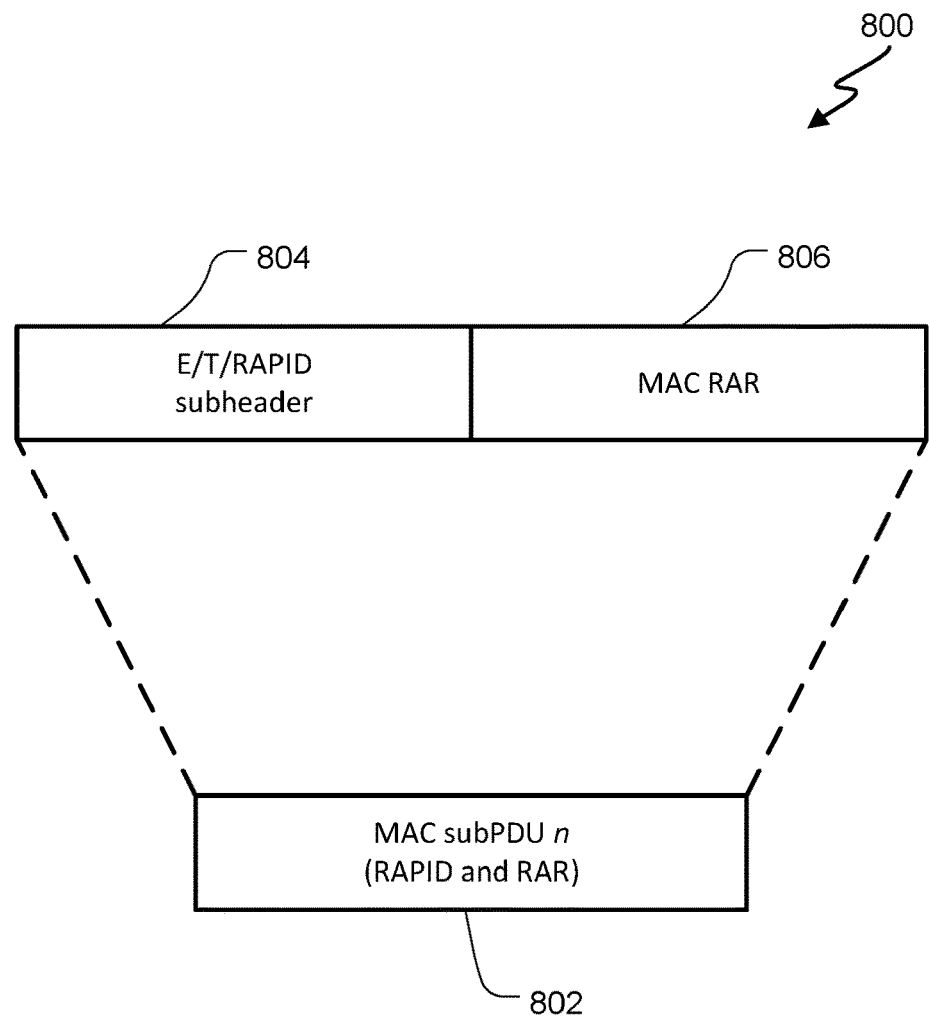
FIG. 8 is a block diagram of an example medium access control packet data unit.

Referring to FIG. 8, with further reference to FIGS. 6 and 7, a block diagram of an example medium access control packet data unit (MAC PDU) 800 is shown. The MAC PDU 800 is described in 3GPP TS38.321. As used herein, a MAC subPDU 802 may be included in Msg2 618 transmitted from the NG-RAN node 604 to the UE 602. The MAC subPDU 802 includes a RAPID subheader block 804 and a MAC Random Access Response (RAR) block 806. As used in Msg2, the NG-RAN 604 is configured to include the preamble received in Msg1 (e.g., 616, 716) in a RAPID subheader block 804 which is used as the acknowledgment in Msg2. The payload in the MAC RAR block 806 may include an indication for the UE 602 to remain in, or go back to, an idle mode of operation (e.g., RCC_IDLE).

Figure 9A:
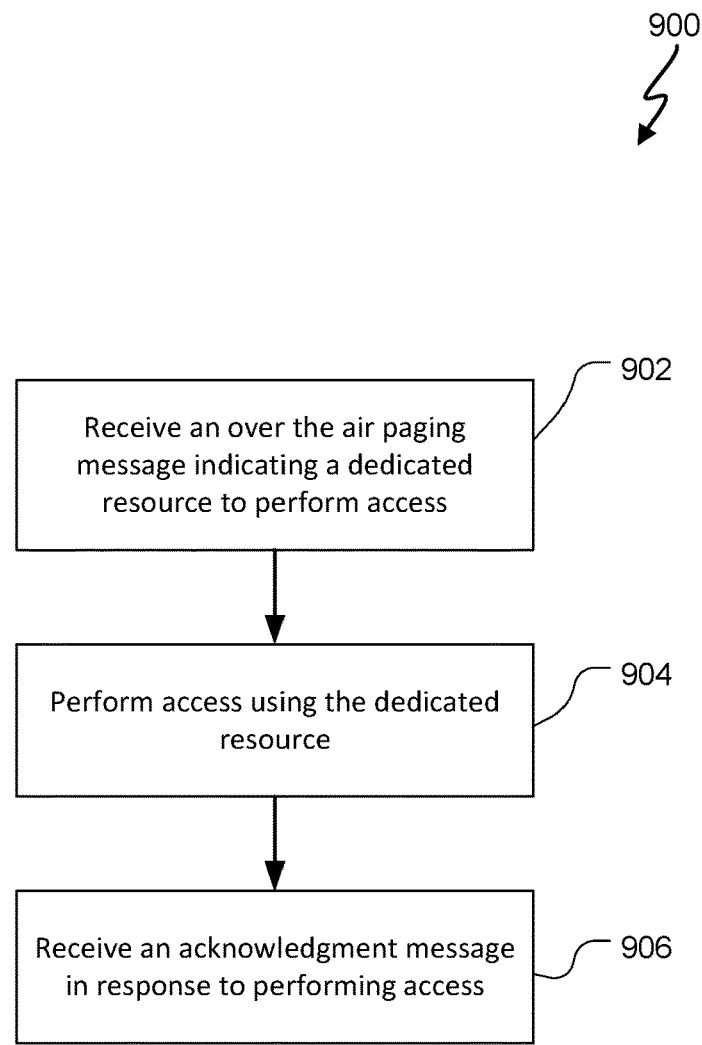
FIG. 9A is a block flow diagram of an example method for responding to a paging message with a user equipment on a dedicated resource.

Referring to FIG. 9A, with further reference to FIGS. 1-8, a method 900 for responding to a paging message with a user equipment on a dedicated resource includes the stages shown. The method 900 is, however, an example only and not limiting. The method 900 may be altered, e.g., by having stages added, removed, rearranged, combined, performed concurrently, and/or having single stages split into multiple stages. For example, one or more stages may occur before, and/or one or more stages may occur after, the stages shown in FIG. 9A.

At stage 902, the method 900 includes receiving an over-the-air (OTA) paging message indicating a dedicated resource to perform access. The transceiver 215 in the UE 200 is a means for receiving the OTA paging message. Referring to FIG. 6, the NG-RAN node 604 is configured to generate the paging message 614 including the dedicated resource for the UE 602 to perform access. In an example, the dedicated resource may constitute a preamble for transmission on a Random Access Channel (RACH). In another example, the dedicated resource may constitute a preamble for transmission on a Random Access Channel (RACH) and an UL grant for transmission on a Physical Uplink Shared Channel (PUSCH).

At stage 904, the method 900 includes performing access using the dedicated resource. The processor 230 and the transceiver 215 in the UE 200 are a means for performing access. The UE 602 is configured to provide Msg1 616 to the NG-RAN node 604 using the dedicated resource. In an example, the UE 602 may include a secure message in Msg1 716 and use the dedicated resource to provide the secure message to the NG-RAN node 604.

At stage 906, the method 900 includes receiving an acknowledgment message in response to performing access. The transceiver 215 in the UE 200 is a means for receiving an acknowledgment message. In an example, the NG-RAN node 604 is configured to provide Msg2 618, including an acknowledgment, to the UE 602. The acknowledgment may utilize part of the MAC sub-header PDU 802. In an example, the acknowledgment may be included in the RAPID sub-header block 804. In an example, the acknowledgment message may optionally include an indication for the UE 602 to remain in an idle state.

Figure 9B:
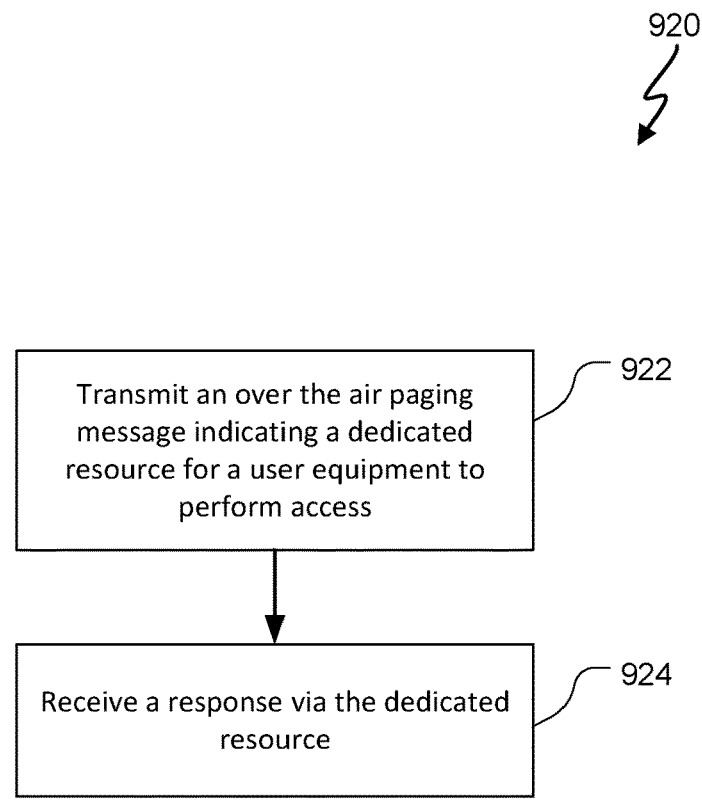
FIG. 9B is a block flow diagram of an example method for transmitting a paging message indicating a dedicated resource to a user equipment.

Referring to FIG. 9B, with further reference to FIGS. 1-8, a method 920 for transmitting a paging message indicating a dedicated resource includes the stages shown. The method 920 is, however, an example only and not limiting. The method 920 may be altered, e.g., by having stages added, removed, rearranged, combined, performed concurrently, and/or having single stages split into multiple stages. For example, one or more stages may occur before, and/or one or more stages may occur after, the stages shown in FIG. 9B.

At stage 922, the method 920 includes transmitting an over-the-air (OTA) paging message indicating a dedicated resource for a user equipment to perform access. The transceiver 315 in the TRP 300 is a means for transmitting the OTA paging message. Referring to FIG. 6, the NG-RAN node 604 is configured to transmit the paging message 614 including the dedicated resource for the UE 602 to perform access. In an example, the dedicated resource may constitute a preamble for transmission on a Random Access Channel (RACH). In another example, the dedicated resource may constitute a preamble for transmission on a Random Access Channel (RACH) and an UL grant for transmission on a Physical Uplink Shared Channel (PUSCH).

At stage 924, the method 920 includes receiving a response via the dedicated resource. The transceiver 315 in the TRP 300 is a means for receiving the response. The UE 602 is configured to provide Msg1 616 to the NG-RAN node 604 using the dedicated resource. In an example, the UE 602 may include a secure message in Msg1 716 and use the dedicated resource to provide the secure message to the NG-RAN node 604.

Figure 9C:
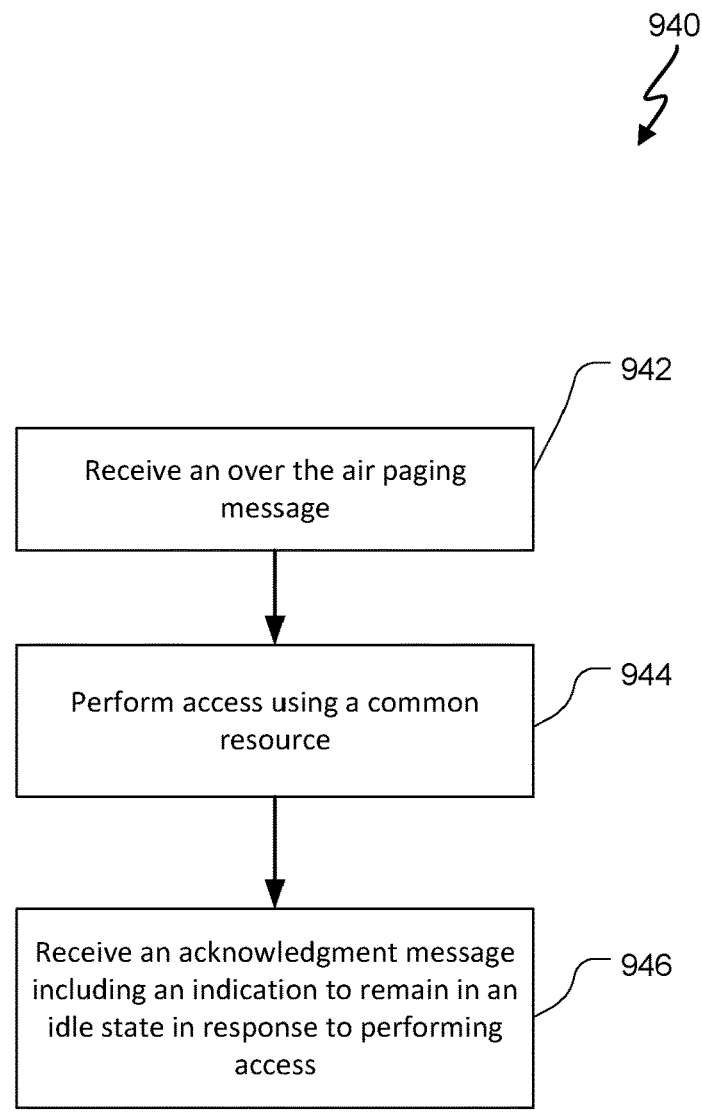
FIG. 9C is a block flow diagram of an example method for receiving an acknowledgement message indicating that a user equipment is to remain in an idle state.

Referring to FIG. 9C, with further reference to FIGS. 1-8, a method 940 for receiving an acknowledgment message indicating that a user equipment is to remain in an idle state includes the stages shown. The method 940 is, however, an example only and not limiting. The method 940 may be altered, e.g., by having stages added, removed, rearranged, combined, performed concurrently, and/or having single stages split into multiple stages. For example, one or more stages may occur before, and/or one or more stages may occur after, the stages shown in FIG. 9C.

At stage 942, the method 940 includes receiving an over-the-air (OTA) paging message. The transceiver 215 in the UE 200 is a means for receiving the OTA paging message. Referring to FIG. 6, in an example, the NG-RAN node 604 may be configured to generate the paging message 614 without an indication of the dedicated resource. The paging message 614 may be similar to known paging strategies such as described in 3GPP TS 23.502, sec. 4.2.3.3.

At stage 944, the method 940 includes performing access using a common resource. The processor 230 and the transceiver 215 in the UE 200 are a means for performing access. The UE 602 is configured to provide Msg1 616 to the NG-RAN node 604 using a common resource. For example, the common resource may be a contention based random access procedure and Msg1 616 may include a random access preamble transmission.

At stage 946, the method 940 includes receiving an acknowledgment message including an indication to remain in an idle state in response to performing access. The transceiver 215 in the UE 200 is a means for receiving an acknowledgment message. In an example, the NG-RAN node 604 is configured to provide Msg2 618, including an acknowledgment, to the UE 602. The acknowledgment may utilize part of the MAC sub-header PDU 802. In an example, the acknowledgment may be included in the RAPID sub-header block 804 and an indication for the UE 602 to remain in an idle state may be provided in the MAC RAR 806. The indication may be a bit, character or other symbol in the payload of the MAC RAR 806. Other frames or subframes in Msg2 618 may also be used to inform the UE 602 to remain in an idle state (e.g., CM_IDLE, RCC_IDLE).

Figure 9D:
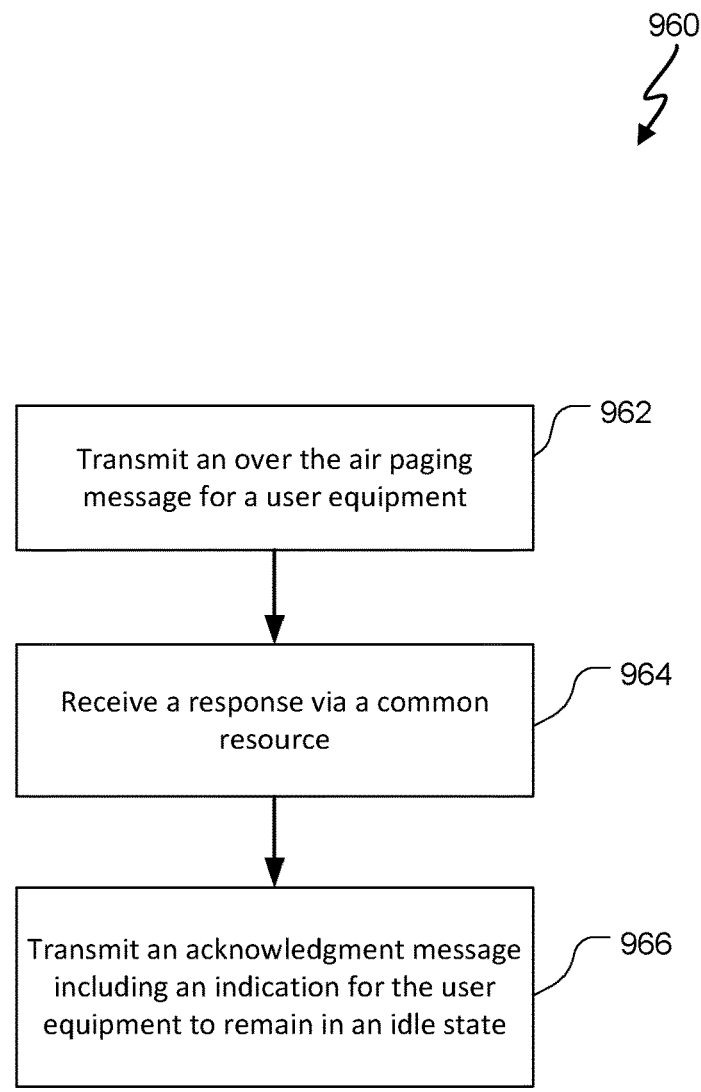
FIG. 9D is a block flow diagram of an example method for transmitting an acknowledgement message indicating that a user equipment is to remain in an idle state.

Referring to FIG. 9D, with further reference to FIGS. 1-8, a method 960 for transmitting an acknowledgement message indicating that a user equipment is to remain in an idle state includes the stages shown. The method 960 is, however, an example only and not limiting. The method 960 may be altered, e.g., by having stages added, removed, rearranged, combined, performed concurrently, and/or having single stages split into multiple stages. For example, one or more stages may occur before, and/or one or more stages may occur after, the stages shown in FIG. 9D.

At stage 962, the method 960 includes transmitting an over-the-air (OTA) paging message for a user equipment. The transceiver 315 in the TRP 300 is a means for transmitting the OTA paging message. Referring to FIG. 6, in an example, the NG-RAN node 604 may be configured to generate the paging message 614 without an indication of the dedicated resource. The paging message 614 may be similar to known paging strategies such as described in 3GPP TS 23.502, sec. 4.2.3.3.

At stage 964, the method 960 includes receiving a response via a common resource. The transceiver 315 in the TRP 300 is a means for receiving the response. In an example the UE 602 is configured to provide Msg1 616 to the NG-RAN node 604 using a common resource. For example, the common resource may be a contention based random access procedure and Msg1 616 may include a random access preamble transmission.

At stage 966, the method 960 includes transmitting an acknowledgment message including an indication for the user equipment to remain in an idle state. The transceiver 315 in the TRP 300 is a means for transmitting the acknowledgment message. The NG-RAN node 604 is configured to provide Msg2 618, including an acknowledgment, to the UE 602. In an example the acknowledgment message may utilize part of the MAC sub-header PDU 802 (e.g., the RAPID subheader block 804). The indication for the UE 602 to remain in an idle state may be provided in the MAC RAR 806 of the MAC sub-header PDU 802. The indication may be a bit, character or other symbol in the payload of the MAC RAR 806. Other frames or subframes in Msg2 618 may also be used to inform the UE 602 to remain in, or change to, an idle state (e.g., CM_IDLE, RCC_IDLE).

Figure 10:
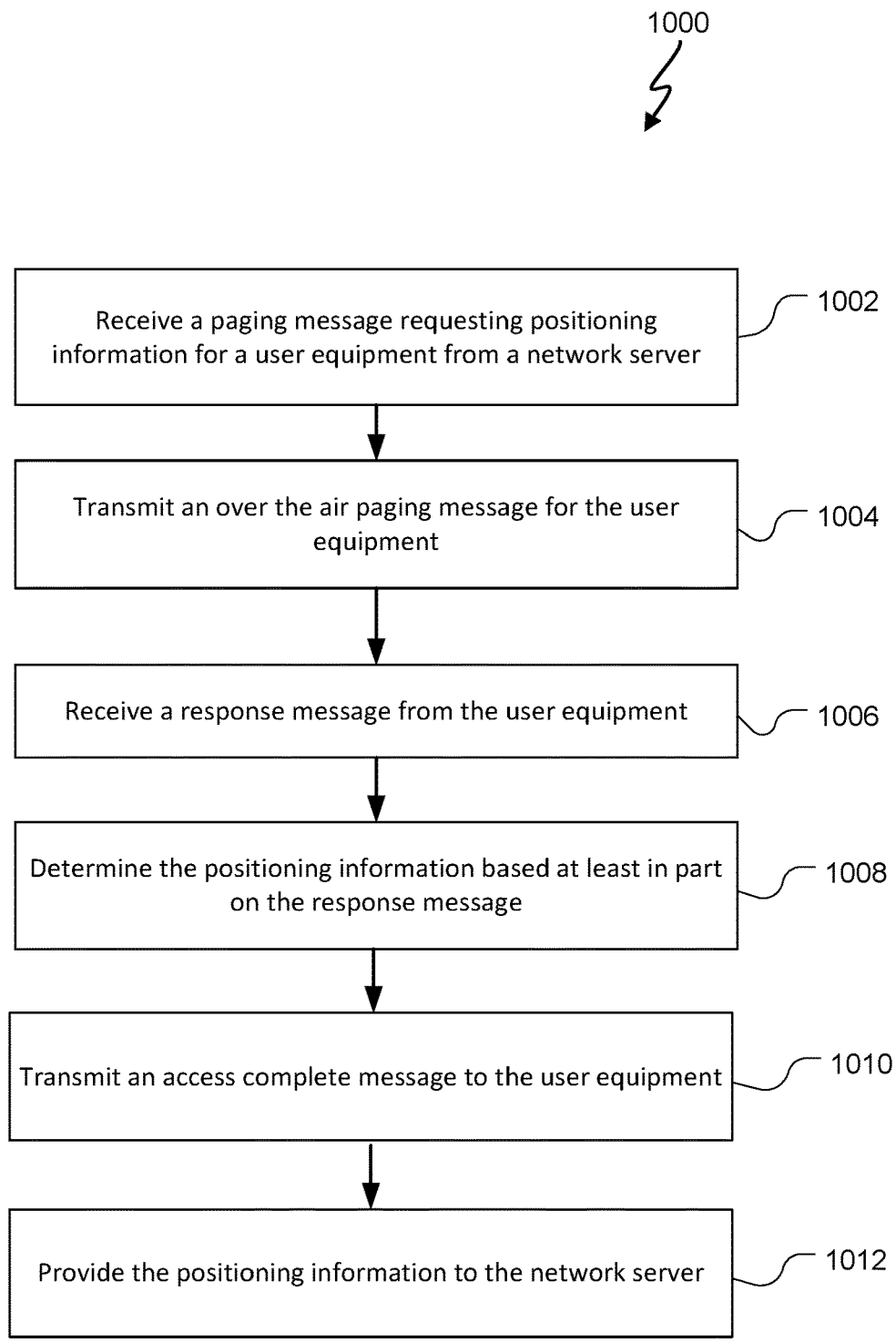
FIG. 10 is a block flow diagram of an example method for providing positioning information to a network server.

Referring to FIG. 10, with further reference to FIGS. 1-8, a method 1000 for providing positioning information to a network server includes the stages shown. The method 1000 is, however, an example only and not limiting. The method 1000 may be altered, e.g., by having stages added, removed, rearranged, combined, performed concurrently, and/or having single stages split into multiple stages. For example, one or more stages may occur before, and/or one or more stages may occur after, the stages shown in FIG. 10.

At stage 1002, the method 1000 includes receiving a paging message requesting positioning information for a user equipment from a network server. The wired transceiver 350 in the TRP 300 is a means for receiving the paging message. In an example, the NG-RAN node 604 is configured to receive the paging message 612 from the AMF 606. The paging message 612 may indicate that ECID positioning information such as the Cell ID (of the serving NG-RAN node 604), and the TA and AoA associated with a transmission received by the NG-RAN node 604 from the UE 602 are required. Other positioning information may be included in the paging message 612.

At stage 1004, the method 1000 includes transmitting an over-the-air (OTA) paging message for the user equipment. The wireless transceiver 340 in the TRP 300 is a means for transmitting the OTA paging message. The NG-RAN node 604 is configured to transmit the OTA paging message 614. The paging message 614 may be similar to known paging strategies such as described in 3GPP TS 23.502, sec. 4.2.3.3. In an example, the paging message 614 may optionally include an indication of a dedicated resource for the UE 602 to use for the transmission of Msg1 616. Providing the indication of the dedicated resource to the UE 602 may eliminate contention for the resource to be used by the UE 602 for random access. In an example, the dedicated resource may constitute a preamble for transmission on a Random Access Channel (RACH). In an example, the dedicated resource may constitute a preamble for transmission on a Random Access Channel (RACH) and an UL grant for transmission on a Physical Uplink Shared Channel (PUSCH).

At stage 1006, the method 1000 includes receiving a response message from the user equipment. The wireless transceiver 340 in the TRP 300 is a means for receiving the response message. In an example the UE 602 is configured to provide Msg1 616 to the NG-RAN node 604 using a common resource. For example, the common resource may be a contention based random access procedure and Msg1 616 may include a random access preamble transmission. In another example, the UE 602 is configured to provide Msg1 616 to the NG-RAN node 604 using the dedicated resource. The dedicated resource may constitute a preamble for transmission on a Random Access Channel (RACH), or the dedicated resource may constitute a preamble for transmission on a Random Access Channel (RACH) and an UL grant for transmission on a Physical Uplink Shared Channel (PUSCH). In another example, the UE 602 may include a secure message in Msg1 716 and use the dedicated resource to provide the secure message to the NG-RAN node 604.

At stage 1008, the method 1000 includes determining the position information based at least in part on the response message. The processor 310 and the wireless transceiver 340 in the TRP 300 are a means for determining the position information. The UE 602 provides the response message (i.e., Msg1 616) to the NG-RAN node 604. The TA value may be based on uplink and downlink timing in the Msg1 616. For example, in a 5G Timing Advance, an uplink frame for transmission from the UE 602 may start $T_{TA}=(N_{TA}+N_{TA\ offset})*Tc$ before the start of the corresponding downlink frame at the UE 602, where $N_{TA\ offset}$ depends on the frequency band. The AoA may be determined by the NG-RAN node 604 based on receiver beam forming processes. The NG-RAN node 604 may be configured to generate receive beams across the coverage area and detect Msg1 616 with one or more of the receive beams. The AoA may be determined based on angles of the receive beams and the corresponding signal strengths in the respective receive beams. Other beam forming techniques may also be used to determine the AoA. The NG-RAN node 604 is configured to provide position information including a Cell ID, TA and AoA to the network.

At stage 1010, the method 1000 includes transmitting an access complete message to the user equipment. The transceiver 315 in the TRP 300 is a means for transmitting the access complete message. The NG-RAN node 604 is configured to provide Msg2 618, including an acknowledgment, to the UE 602. The Msg2 618 may utilize part of the MAC sub-header PDU 802 and an acknowledgment may be included in the RAPID subheader block 804. In an example, an indication for the UE 602 to remain in an idle state may be provided in the MAC RAR 806 of the MAC sub-header PDU 802. The indication may be a bit, character or other symbol in the payload of the MAC RAR 806. Other frames or subframes in Msg2 618 may also be used to inform the UE 602 to remain in an idle state (e.g., CM_IDLE, RCC_IDLE).

At stage 1012, the method 1000 includes providing the positioning information to the network server. The wired transceiver 350 in the TRP 300 is a means for providing the positioning information. The NG-RAN node 604 is configured to provide the Cell ID, TA, and AoA values to the AMF 606 via the Initial UE message 620 or a similar message. The Initial UE message 620 reduces or eliminates the need for signaling a connection established between NG-RAN node 604 and the AMF 606 and thus may reduce the required signaling overhead between network nodes. In an example, the NG-RAN node 604 may provide the position information in a secure message such as the Initial UE message 720 and the AMF 606 may be configured to validate the secure message.

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. For example, one or more functions, or one or more portions thereof, discussed above as occurring in a server 400 may be performed outside of the server 400 such as by the TRP 300.

As used herein, the singular forms "a," "an," and "the" include the plural forms as well, unless the context clearly indicates otherwise. For example, "a processor" may include one processor or multiple processors. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items prefaced by "at least one of" or prefaced by "one or more of" indicates a disjunctive list such that, for example, a list of "at least one of A, B, or C," or a list of "one or more of A, B, or C" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless communication system is one in which at least some communications are conveyed wirelessly, e.g., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "processor-readable medium," "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected, coupled (e.g., communicatively coupled), or communicating with each other are operably coupled. That is, they may be directly or indirectly, wired and/or wirelessly, connected to enable signal transmission between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

"About" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. "Substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Further, more than one invention may be disclosed.

The invention claimed is:

1. A method for responding to an over-the-air paging message with a user equipment (UE), wherein the over-the-air paging message is based on a network positioning message for determining a position of the UE with a base station, comprising:
receiving, while in an idle state, the over-the-air paging message indicating a dedicated resource to perform access, wherein the over-the-air paging message is based on a network positioning message;
generating, while in the idle state, a ciphered secure message including identification information associated with the UE;
performing, while in the idle state, access and providing the ciphered secure message using the dedicated resource, wherein providing the ciphered secure message includes transmitting the ciphered secure message to the dedicated resource to determine the position of the UE with the base station; and
receiving, while in the idle state, an acknowledgement message in response to performing access, a payload of the acknowledgement message including an indication to remain in the idle state.

2. The method of claim 1 wherein the dedicated resource includes a preamble for transmission on a random access channel.

3. The method of claim 1 wherein the dedicated resource includes a preamble for transmission on a random access channel and a uplink grant for transmission on a physical uplink shared channel.

4. A method for transmitting an over-the-air paging message with a base station, wherein the over-the-air paging message is based on a network positioning message for determining a position of a user equipment (UE) with a base station, comprising:
transmitting the over-the-air paging message, to the UE in an idle state, indicating a dedicated resource to perform access, wherein the over-the-air paging message is based on a network positioning message;
receiving a response, from the UE in the idle state, including a ciphered secure message via the dedicated resource;
determining the position of the UE from the response; and
sending an acknowledgement message to the UE, a payload of the acknowledgement message including an indication to remain in the idle state.

5. The method of claim 4 wherein the dedicated resource includes a preamble for transmission on a random access channel.

6. The method of claim 4 wherein the dedicated resource includes a preamble for transmission on a random access channel and a uplink grant for transmission on a physical uplink shared channel.

7. An apparatus, comprising:
a memory;
at least one transceiver;
at least one processor communicatively coupled to the memory and the at least one transceiver and configured to:
receive, with the at least one transceiver while in an idle state, an over-the-air paging message indicating a dedicated resource to perform access, wherein the over-the-air paging message is based on a network positioning message for determining a position of a user equipment (UE) with a base station;
generate, while in the idle state, a ciphered secure message including identification information associated with the apparatus;
perform access and provide the ciphered secure message using the dedicated resource while in the idle state, the at least one processor is configured to provide the ciphered secure message by transmitting the ciphered secure message to the dedicated resource to determine the position of the UE with the base station; and
receive, with the at least one transceiver while in the idle state, an acknowledgement message in response to performing access, a payload of the acknowledgement message including an indication to remain in the idle state.

8. The apparatus of claim 7 wherein the dedicated resource includes a preamble for transmission on a random access channel.

9. The apparatus of claim 7 wherein the dedicated resource includes a preamble for transmission on a random access channel and a uplink grant for transmission on a physical uplink shared channel.

10. An apparatus, comprising:
a memory;
at least one transceiver;
at least one processor operably coupled to the memory and the at least one transceiver and configured to:
transmit, with the at least one transceiver, an over-the-air paging message, to a user equipment (UE) in an idle state, indicating a dedicated resource to perform access, wherein the over-the-air paging message is based on a network positioning message for determining a position of the UE with a base station;
receive, with the at least one transceiver, a response, from the UE in the idle state, including a ciphered secure message via the dedicated resource;
determine the position of the UE from the response; and
send an acknowledgement message to the UE, a payload of the acknowledgement message including an indication to remain in the idle state.

11. The apparatus of claim 10 wherein the dedicated resource includes a preamble for transmission on a random access channel.

12. The apparatus of claim 10 wherein the dedicated resource includes a preamble for transmission on a random access channel and a uplink grant for transmission on a physical uplink shared channel.

13. An apparatus for responding to an over-the-air paging message with a user equipment (UE), wherein the over-theair paging message is based on a network positioning message for determining a position of the UE with a base station, comprising:
- means for receiving, while in an idle state, the over-the-air paging message indicating a dedicated resource to perform access;
- means for generating, while in the idle state, a ciphered secure message including identification information associated with the UE;
- means for performing, while in the idle state, access and providing the ciphered secure message using the dedicated resource, wherein the means for providing the ciphered secure message includes means for transmitting the ciphered secure message to the dedicated resource to determine the position of the UE with the base station; and
- means for receiving, while in the idle state, an acknowledgement message in response to performing access, a payload of the acknowledgement message including an indication to remain in the idle state.

14. An apparatus for transmitting an over-the-air paging message with a base station, wherein the over-the-air paging message is based on a network positioning message for determining a position of a user equipment (UE) with a base station, comprising:
- means for transmitting the over-the-air paging message, to the UE in an idle state, indicating a dedicated resource to perform access;
- means for receiving, from the UE in the idle state, a response including a ciphered secure message via the dedicated resource;
- means for determining the position of the UE from the response; and
- means for sending an acknowledgement message to the UE, a payload of the acknowledgement message including an indication to remain in the idle state.

15. A non-transitory processor-readable storage medium comprising processor-readable instructions configured to cause one or more processors to respond to an over-the-air paging message with a user equipment (UE), wherein the over-the-air paging message is based on a network positioning message for determining a position of the UE with a base station, comprising:
- code for receiving, while in an idle state, the over-the-air paging message indicating a dedicated resource to perform access;
- code for generating while in the idle state, a ciphered secure message including identification information associated with the UE;
- code for performing while in the idle state, access and providing the ciphered secure message using the dedicated resource, wherein the code for providing the ciphered secure message includes code for transmitting the ciphered secure message to the dedicated resource to determine the position of the UE with the base station; and
- code for receiving while in the idle state, an acknowledgement message in response to performing access, a payload of the acknowledgement message including an indication to remain in the idle state.

16. A non-transitory processor-readable storage medium comprising processor-readable instructions configured to cause one or more processors to transmit an over-the-air paging message with a base station, wherein the over-the-air paging message is based on a network positioning message for determining a position of a user equipment (UE) with a base station, comprising:
- code for transmitting the over-the-air paging message, to the UE in an idle state, indicating a dedicated resource to perform access;
- code for receiving a response, from the UE in the idle state, including a ciphered secure message via the dedicated resource;
- code for determining the position of the UE from the response; and
- code for sending an acknowledgement message to the UE, a payload of the acknowledgement message including an indication to remain in the idle state.

* * * * *